United States Patent [19]
Danford

[11] 4,308,427
[45] Dec. 29, 1981

[54] HANDS-FREE TALK-BACK INTERCOMMUNICATION SYSTEM

[75] Inventor: Glenn S. Danford, Oklahoma City, Okla.

[73] Assignee: Southwest Utilities, Inc., Oklahoma City, Okla.

[21] Appl. No.: 73,075

[22] Filed: Sep. 6, 1979

[51] Int. Cl.³ .............................................. H04M 1/60
[52] U.S. Cl. ................................ 179/1 HF; 179/81 B
[58] Field of Search ............... 179/1 H, 1 HF, 1 VC, 179/37, 39, 81 B, 99 A, 18 AD, 1 MN

[56] References Cited

U.S. PATENT DOCUMENTS

3,743,791 7/1973 Duff et al. ..................... 179/81 B
4,081,622 3/1978 Clark et al. ................... 179/81 B

Primary Examiner—Joseph A. Popek
Attorney, Agent, or Firm—Robert M. Hessin

[57] ABSTRACT

A hands-free talk-back two-way intercommunication system is disclosed. The system includes a plurality of local stations connected to a main distribution station. Also connected to the main distribution station may be a direct station selector. At least one of the local stations includes a telephone and at least one of the other local stations includes a transducer element. The telephone and the transducer element may be connected in communication with each other through the main distribution station which includes a listen/talk channel controlling member, a call monitoring member and a station selecting member. The listen/talk channel controlling member includes apparatus for adjusting the balance between the listen and talk channels. The channel controlling member also includes apparatus for providing a notification signal to any transducer member which is addressed by the telephone. The channel controlling member further includes apparatus whereby either one of two levels of gain can be used in providing a conversational signal between the telephone and accessed transducer element.

13 Claims, 9 Drawing Figures

HANDS-FREE TALK-BACK INTERCOMMUNICATION SYSTEM

BACKGROUND OF THE INVENTION

1. Field of the Invention

This invention relates generally to intercommunication systems and more particulatly, but not by way of limitation, to intercommunication systems having apparatus whereby two-way communication can be maintained between the calling station and the called station or stations.

2. Description of the Prior Art (Prior Art Statement)

The following statement is intended to be a prior art statement in compliance with the guidance and requirements of 37 C.F.R. §§ 1.56, 1.97 and 1.98.

Several intercom systems are known to be, or to have been, used. These systems are believed to be classifiable in one of two categories. The first category includes those systems having customized telephones which include special built-in electronic circuitry. The second category includes those types of systems which have large boxes or housings used in addition to the telephones with which such systems are used.

Regardless of the classification, however, these presently known types generally use unbalanced lines to interconnect the individual local stations with a central control unit. Also, each of these types uses various types of electronic switching circuits to perform the necessary functions of interconnecting the calling and called stations.

These systems generally indicate the need for some type of intercommunication system. More particularly, our present manner of living creates the need for intercommunication systems in such places as the home, business and hospital so that rapid communication may be spread to diverse and distant locations.

To satisfy such needs in an economically feasible manner, there is the further need to utilize ordinary telephones which are normally present in such places as the home, business and hospital. Further, it is important that the intercom system be simple to install so that installation and service costs may be kept to a minimum.

Although these needs are important, it is also important to provide an intercom system which provides relatively high quality audio so that the communications can be understood. Furthermore, there is the need that the system be versatile so that either individual or multiple stations may be addressed and also so that the communication can be broadcast in either a conversational level or a power amplification level. In such a versatile system wherein either an individual station or a plurality of stations may be called, it is important to provide the conversational level with separate output level controls so that one lever can be used when the communication is between only the calling and a single called station, for example, and a separate lever can be used when all of the stations are being addressed.

Still another need is to provide an intercommunication system which permits two-way conversation. To provide such a two-way system creates the further need for the system to have a talk channel and a listen channel which are interconnected to prevent lock up in either the listen or the talk modes. Furthermore, such interconnected channels raise the need for a built-in balance detector to test and set the balance for the least power feedback between the talk and listen channels. Another need in such a two-way system is the provision of apparatus for generating warning, or notification, signals to advise local stations that have been called that they are actively connected to a calling station.

In addition to these many needs, there is the need for apparatus within the intercommunication system whereby a central operator may directly select and communicate with any one or more of the various local stations.

Although as previously stated, there are various types of intercommunication systems presently known, it is believed that each of these systems has the shortcoming of failing to meet each and every one of these needs.

SUMMARY OF THE INVENTION

The present invention overcomes the above-noted and other shortcomings of the prior art by providing a novel, useful and improved hands-free, talk-back two-way intercommunication system. Such an intercommunication system as is hereinafter disclosed is readily adaptable for use in any of a number of places such as the home, business and hospital.

The present invention utilizes ordinary telephones which do not need non-standard internal circuit modification as other types of systems need. The present invention utilizes these ordinary telephones by making simple installation connections to existing portions of the telephone. Furthermore, the connections between the telephones and the remainder of the present invention are made via twisted pair wires or other suitable lines to provide a balanced line for insuring relatively high quality audio communications.

The present invention is also versatile in that either individual or multiple stations may be called and either one of two conversation levels or a power amplification level may be broadcast. The particular conversational level is automatically selected by the present invention depending upon whether all or less than all of the stations are called. This is important because of the different output level requirements between communicating with either a single station or all of the stations in an "all call" situation, for example.

In addition to meeting these needs, the present invention also meets the need of providing a system wherein two-way communication may be effected. So that the system will not lock up in either the listen mode or the talk mode, the talk and listen channels of the present invention are interconnected so that the calling station always has control and thus can prevent a lock up. Furthermore, the present invention includes a built-in balance detector so that the balance between the interconnected channels can be checked and set for the least amount of power feedback. Additionally, since a local station may be called and listened in on due to the two-way communication feature of the present invention, the present invention includes apparatus for periodically sending warning, or notification, signals to each called station to notify that station that it is in active communication with another station.

Still further, the present invention includes apparatus whereby a central operator may directly select one or more of the local stations.

The present invention of a communication system having a talk channel and a listen channel generally includes a main distribution station and a plurality of local stations associated with the main distribution station. Additionally, the system of the present invention may include a direct station selector which includes means for directly selecting one of the local stations so that the selected local station is in communication with the talk and listen channels of the communication system.

The plurality of local stations of the present invention includes a first local station which has a first telephone connected to the main distribution station. There is also a second local station which has a first transducer means which is connected to the main distribution station so that the connection is balanced to provide high quality audio signal transmission throughout the intercommunication system. With only these two local stations, only the first local station may call the second local station because the telephone is used as the calling instrument. Therefore, for the second local station to be able to call the first local station in the manner contemplated by the present invention, the second local station may include a second telephone and the first local station may include a second transducer means. This transducer means would likewise be connected to the main distribution station in a balanced electrical connection. More particularly, the balanced electrical connection may be by means of a single twisted pair of electrically conducting wires.

The main distribution station of the present invention includes three main elements. The first element is a means which is connected to the first telephone for monitoring the first telephone to detect when it initiates a call to the second local station. The second element is a means for selecting the first transducer means in response to the monitoring means detecting the initiation of a call to the second local station by the first telephone. This selecting means not only selects, but also places the first transducer means in communication with the talk and listen channels of the intercommunication system. The third element of the main distribution station is a means for controlling the communication on the talk and listen channels between the calling first telephone and the called first transducer means.

As with the main distribution station, each of these three elements includes a number of elements.

The call monitoring means of the main distribution station includes a means for enabling the monitoring means in response to a signal from the first telephone. There is also a means for splitting the frequency bands of an address signal received from the first telephone and a means for decoding the tones contained within the split frequency bands. Connected to the decoding means is a means for activating the transducer selecting means in response to the detection of one or more predetermined tones by the decoding means. Finally, the call monitoring means includes means for supplying electrical power to the transducer selecting means in response to the detection of such pedetermined tones.

The transducer selecting means of the main distribution station includes a first switch means and a second switch means. The first switch means is responsive to a signal from the call monitoring means whereas the second switch means is manually switchable.

The channel controlling means includes a means for providing an electrical interface between the talk channel and the listen channel and the first telephone. Associated with this interfacing means is a means for balancing the interface to adjust for minimum power feedback from the listen channel to the talk channel. Also included within the controlling means is a first talk amplifier means connected to the interfacing means. Connected to this amplifier means are a first means for setting a first level of loudness and a second means for setting a second level of loudness. Each of these first and second setting means is selectably connectable to the first talk amplifier means in response to a signal from the call monitoring means. Additionally, the controlling means includes a second talk amplifier means connected to the first and second level setting means for providing an output from the talk channel. Connected to this output is a means for switchably connecting the first transducer means to a respective one of either the output from the talk channel or an input to the listen channel. The input to the listen channel is provided by a means connected to the switchable connecting means for activating an electrical signal for testing the balancing means. Associated with this test activating means is a means for automatically controlling the gain of the listen channel. Finally, the channel controlling means includes a means connected to the interfacing means, to the activating means, and to the switchable connecting means for automatically controlling the switching by the switchable connecting means of the first transducer means to a respective one of either the output of the talk channel or the input of the listen channel.

To operate the present invention one who wishes to place a call on the system picks up the handset of the first telephone and dials or pushes the number specifying the address of the station to be called. The lifting of the handset and the addressing of the local station to be called are detected by the call monitoring means. The call monitoring means decodes the address and activates the selecting means to select the local station which has been called. In the basic system of a single telephone and a single transducer means, this called station will be the second local station having the first transducer means. By so selecting the called station, the call monitoring means and the transducer selecting means place the transducer means located there in communication with the talk and listen channels contained within, and controlled by, the talk and listen channel controlling means.

When communication has been established, the channel controlling means places the system in the listen mode whereby the handset listens for any sounds detected by the first transducer means of the called local station. Should the person with the handset desire to communicate with a person located in the vicinity of the first transducer means, the person merely needs to talk into the handset. This generates a signal which is detected by the channel controlling means and causes the controlling means to switch from the listen mode to the talk mode. This switching to the talk mode will occur at normal voice levels if no signal is being concurrently detected by the listen channel, but it will occur only at higher magnitude voice levels if a signal is being concurrently detected by the listen channel. This difference results from the feature of the present invention which prevents lock up in either the talk or listen modes. Thus, in this manner two-way communication is established between the calling local station and the called local station. It is readily apparent that by having a telephone and a transducer means at each local station, any one local station can be used to place a call to any of the other local stations within the intercommunication system of the present invention.

Therefore, from the foregoing, it is a general object of the present invention to provide a novel, useful and improved hands-free talk-back intercommunication system. Other and further objects, features and advantages of the present invention will be readily apparent to those skilled in the art upon a reading of the description of the preferred embodiment which follows, when taken in conjunction with the accompanying drawings.

BRIEF DESCRIPTION OF THE DRAWINGS

FIG. 4D is a schematic diagram of a preferred embodiment electrical circuit implementing the accessed station notifier means shown in FIG. 3.

DETAILED DESCRIPTION OF THE PREFERRED EMBODIMENT OF THE INVENTION

Figures 1, 2, 3:
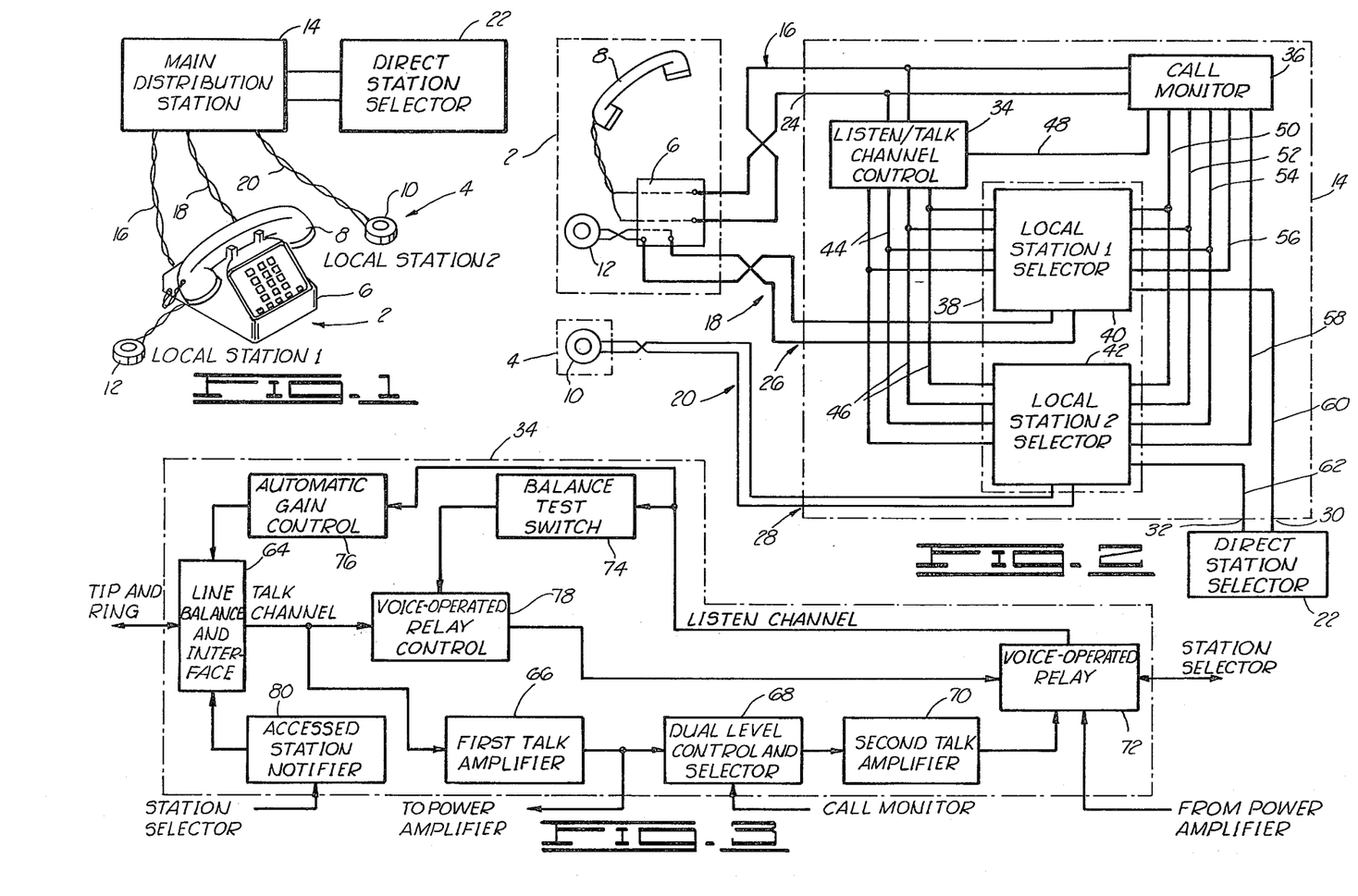
FIG. 1 is a schematic illustration of the general elements of a preferred embodiment of the present invention.
FIG. 2 is a more detailed schematic illustration of the preferred embodiment of the present invention shown in FIG. 1.
FIG. 3 is a functional block diagram of the preferred embodiment listen/talk channel controlling means shown in FIG. 2.

With reference now to the drawings and in particular to FIGS. 1 and 2, the preferred embodiment of the present invention is shown. FIG. 1 discloses that the intercommunication system of the present invention includes a plurality of local stations denoted by the reference numerals 2 and 4 and identified, respectively, as "LOCAL STATION 1" and "LOCAL STATION 2". FIG. 1 illustrates that "LOCAL STATION 1" includes a telephone 6 having a handset 8. FIG. 1 also indicates that "LOCAL STATION 2" includes a first transducer means 10. This single telephone and single transducer means constitute the basic elements required at the local stations in the intercommunication system of the present invention. FIG. 1 also shows, however, that the local station with the telephone may also include a second transducer means 12 as shown located at "LOCAL STATION 1". Furthermore, a second telephone could be located at "LOCAL STATION 2".

FIG. 1 further shows that the elements within each of the local stations are connected to a main distribution station 14. In FIG. 1 these connections are made via the twisted pairs of electrical conductors 16, 18 and 20 which provide balanced communication lines between the respective elements.

FIG. 1 also shows a direct station selector 22 connected to the main distribution station 14. The direct selector 22 includes means for directly selecting one of the local stations so that the selected local station is in communication with a talk channel and a listen channel contained within the present invention as previously mentioned and as discussed further below.

The interconnections among the various elements of the preferred embodiment of the present invention are more particularly disclosed in FIG. 2. As with any ordinary telephone, the telephone 6 includes a tip and ring circuit to which is connected the handset 8. This tip and ring circuit is also connected via the electrical conductors 16 to a first pair of terminals 24 in the main distribution station 14. Also as in any ordinary telephone, the telephone 6 further includes a bell circuit to which is connected the second transducer means 12. The bell circuit is further connected to one pair of a plurality of second pairs of terminals 26 and 28 in the main distribution station 14 by means of electrical conductors 18. From the simple connections of the tip and ring circuit to the main distribution station and of the bell circuit to the transducer means and to the main distribution station, it is apparent that the present invention can easily utilize any ordinary, unmodified telephone for implementing the intercommunication system of the present invention. These simple connections also facilitate the installation and servicing of the present invention.

FIG. 2 also shows that the transducer means can be directly connected to a respective pair of the plurality of second pairs of terminals of the main distribution station 14. This is shown by the connection at terminal pair 28 between the first transducer means 10 and the main distribution station 14 by means of the electrical conductors 20.

FIG. 2 further shows that the direct station selector 22 is connected to the main distribution station 14 at a plurality of single terminals indicated by the reference numerals 30 and 32. The number of single terminals corresponds to the number of local stations which are contained within any particular embodiment of the present invention.

FIG. 2 also generally indicates the elements of the main distribution station 14 to which the previously mentioned terminals and electrical conductors are connected. FIG. 2 shows that the tip and ring circuit of the telephone 6 is connected via the electrical conductor 16 and the first pair of terminals 24 to listen/talk channel controlling means 34 and to a call monitoring means 36. The transducer means are shown to be connected via their respective electrical conductors and second pairs of terminals to elements within a station selecting means 28. In particular, each respective pair of conductors from the local station transducer means is connected to a respective local station selector which is contained within the station selector 38. FIG. 2 specifically shows that the second transducer means 12 is connected to a local station 1 selector means 40 and that the first transducer means 10 is connected to a local station 2 selector means 42.

FIG. 2 further discloses a series of specific connections between the various elements within the main distribution station 14. These connections include a pair of conversational communication lines 44 extending between the channel controlling means 34 and each of the local station selectors within the station selecting means 38. Also extending between the means 34 and 36 is a pair of power amplification communication lines 46. Interconnecting the call monitoring means 36 with the channel controlling means 34 is an enable conductor 48. Interconnecting the call monitoring means 36 with the local station selectors of the station selecting means 28 is an "all call" line 50, a "group call" line 52, and a station power line 54. Each of these three lines is common to all or a group of the local station selectors. Further connecting the call monitoring means 36 with the station selecting means 38 is a first address line 56 extending between the call monitoring means 36 and the local station 1 selector means 40. Extending between the call monitor means 36 and the local station 2 selector means 42 is a second address line 58. FIG. 2 finally discloses that the direct station selector means 22 provides its own individual address lines 60 and 62 extending to respective ones of the local station selectors within the station selecting means 38.

With reference now to FIGS. 3 and 4A-4D, a more detailed description of the listen/talk channel controlling means 34 will be described. Generally, the channel controlling means 34 is a means for controlling the communications over the talk and listen channels between the telephone of the calling local station and the transducer means of the called local station. More particularly, FIG. 3 shows that this control is provided by means which are interconnected to form the previously mentioned talk channel and listen channel.

These means include a first means for providing an interface identified in FIG. 3 as a line balance and interface means 64 which is shown connected to the tip and ring circuit interconnecting the telephones (if more than one is used in a particular system configuration) of the various local stations. Connected to the line balance and interface means 64 is the talk channel which includes a first talk amplifier means 66, a dual level control and selector means 68, and a second talk amplifier means 70. The input to the first talk amplifier means 66 from the line balance and interface means 64 is defined as a first input of the talk channel, and the output from the second talk amplifier means 70 is defined as a first output of the talk channel.

This first output of the talk channel is connected to a second means for providing an interface disposed between the station selecting means 38 and the talk and listen channels of the channel controlling means 34. This second interfacing means is particularly disclosed to be a voice-operated relay means 72. Extending from this second interfacing means is the listen channel which specifically has its input connected to the voice-operated relay 72 as shown in FIG. 3. This input connects to a balance test switch means 74 and also to an automatic gain control means 76. The output from the automatic gain control means 76 defines an output of the listen channel and is connected to the line balance and first interface means 64.

In addition to these elements which define the interface means and the talk and listen channels, the channel controlling means 34 is shown in FIG. 3 to include a means for automatically controlling the second interface means' function of connecting selected stations to a respective one of either the talk channel or listen channel. More particularly, FIG. 3 shows that this automatic controlling means is a voice-operated relay control means 78 connected to the balance test switch means 74, to the line balance and first interface means 64, and to the voice-operated relay means 72. In the basic configuration of a system having a single telephone and a single transducer means, the voice-operated relay control means 78 automatically controls the switching by the voice-operated relay means 72 of the first transducer means to a respective one of either the output of the talk channel or the input of the listen channel.

One further element of the channel controlling means 34 which is connected to the line balance and interface means 64 is an accessed station notifier means 80 which provides a periodic warning signal to any of the local stations which have been addressed and which could otherwise be unknowingly listened in on by the calling local station.

With reference now to FIGS. 4A—4D, these figures more particularly define the elements of the channel controlling means 34 by disclosing a preferred embodiment electrical circuit for implementing the FIG. 3 means. In preface to the circuit description it is to be noted that throughout FIGS. 4A-4D there are disclosed a power system which includes the B+ power bus, a first ground system indicated by the triangle symbol, a second ground system indicated by three parallel horizontal lines, and a virtual ground system indicated by the symbol VG which is at a voltage intermediate the B+ and the first and second ground voltages. In a typical system, for example, the B+ may be at 0 voltage, the first ground at −24 volts, and the second ground at −15 volts. The virtual ground line is then intermediate these at a level such as −7.5 volts. It is also to be noted that, as with the previously mentioned specific voltages, the component values listed in the figures are merely included for purposes of fully disclosing the best mode preferred embodiment of the present invention and are not to be taken as in any way limiting the ranges of values which may be used to implement the present invention.

Figure 4A:
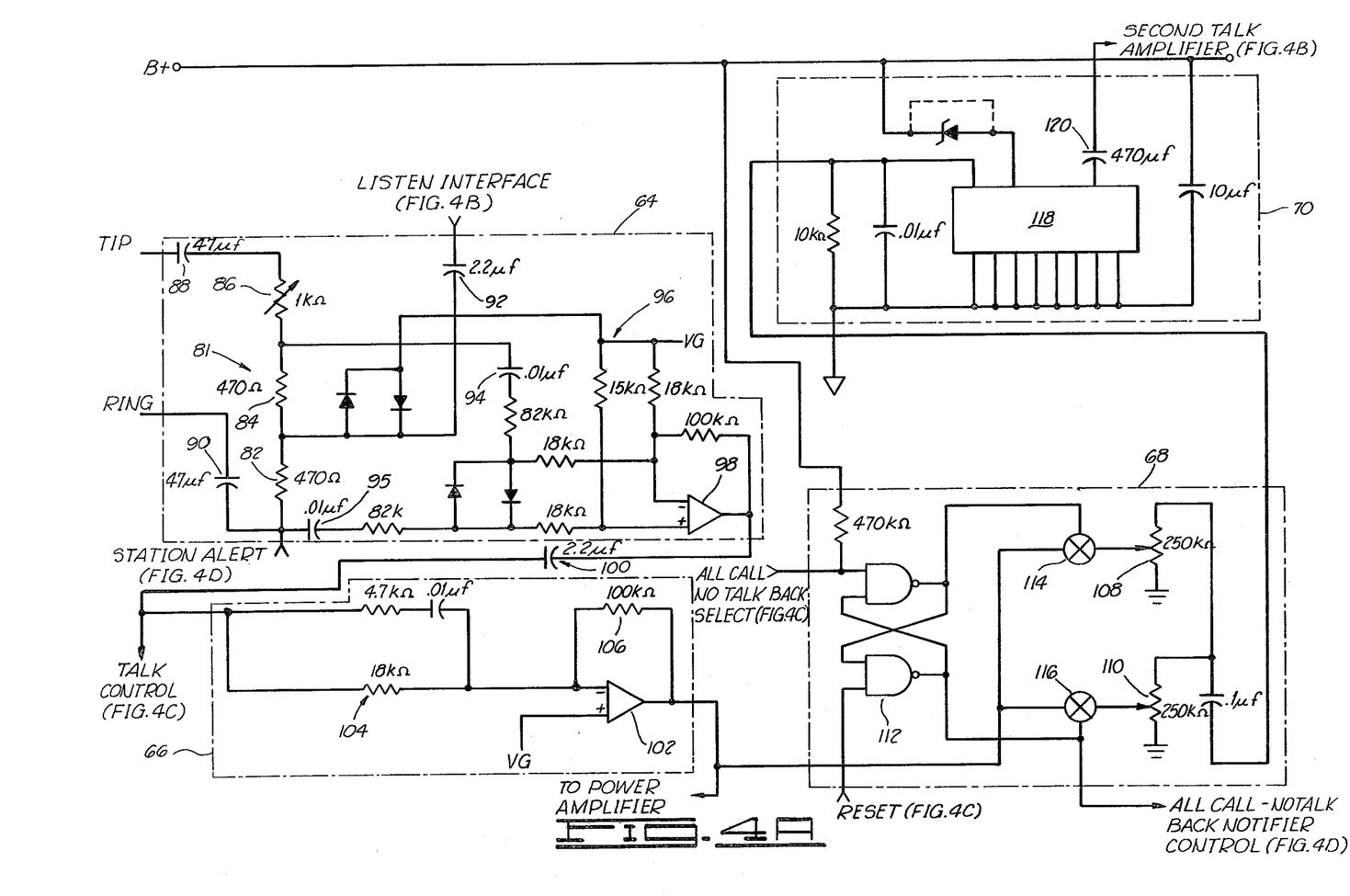
FIG. 4A is a schematic diagram of a preferred embodiment electrical circuit implementing the line balance interface means, the first talk amplifier means, the dual level control and selector means, and the second talk amplifier means of FIG. 3.

FIG. 4A discloses a preferred embodiment electrical circuit for the line balance and first interface means 64, the first talk amplifier means 66, the dual level control and selector means 68 and the second talk amplifier means 70.

The line balance and first interface means 64 generally includes means for providing an electrical interface between the talk channel and the listen channel and the tip and ring circuit of the telephones contained within the system, such as the first telephone 6. The balancing means may be variably controlled so that the electrical balance of the interface can be adjusted to provide a minimum of feedback to be coupled from the listen channel into the talk channel.

The balance and interface means more particularly includes a first resistor network 81 having a first resistor 82, a second resistor 84 and a first variable resistor 86. These three resistors are shown to be connected in series between the tip and ring lines of the telephones of the local stations. This series of resistors is connected to these lines through respective capacitors 88 and 90. It will be noted that the variable resistor 86 permits adjustable control for variably setting the balance of the interface.

The balance and interface means further includes a capacitor 92 which couples the output of the listen channel to the resistor network 81. Also included are capacitors 94 and 95 and a drive amplifier circuit including a second resistor network 96 and an operational amplifier 98, interconnected as known in the art for coupling the talk channel input to the balance and interface means. The output of the operational amplifier 98 provides the audio signal which is coupled through a capacitor 100 to the input of the talk channel at the first talk amplifier means 66.

The first talk amplifier means 66 includes an operational amplifier 102 to which are connected a first resistor-capacitor network 104, a resistor 106 and the virtual ground as is known by those skilled in the art. The output from the operational amplifier 102 is connected to the dual level control and selector means 68. The output may also be connected to a power amplifier for providing a greater amplified audio signal than is provided by the second talk amplifier 70. The use of such a power amplifier in conjunction with the second talk amplifier means 70 provides the present invention with the feature of having the capability of both conversational levels of output and also higher power amplifier levels.

The means 68 includes a first means for setting a first level of loudness and a second means for setting a second level of loudness, each of which is controllable in response to a signal from a means for automatically selecting one of the two loudness levels. Each of the level setting means includes a respective one of the two variable resistors 108 and 110. Each of these resistors is individually controllable to set different levels of gain in the talk channel. The automatic selecting means includes a NAND network 112 connected as is known in the art to provide a latch, and also includes two electronic switches 114 and 116. The switch control input of the switch 114 is connected to one output from the NAND latch 112, and the switch control input of the other switch 116 is connected to the other output from the latch 112. Thus, either one or the other of the switches 114 and 116 is "on" when the other is "off". In other words, the audio signal from the first amplifier means 66 passes through either the switch 114 or the switch 116, but not both, depending upon the outputs of the latch 112.

Therefore, under control of the latch 112 either one or the other of the two separate gain levels may be selected. For example, when the reset input of the latch 112 is activated to reset the latch, the switch 116 will be activated to connect the audio signal from the first talk amplifier means 66 to the gain level setting means of the resistor 110. In this situation the resistor 110 may be set to provide a normal conversational level of gain for use when only a single local station is called by another local station. On the other hand, when all of the stations are called, the other latch 112 input, labeled "ALL CALL-NO TALK BACK SELECT" in FIG. 4A, is activated which in turn activates the switch 114 to interconnect the audio signal from the first talk amplifier means 66 to the gain level setting means of the variable resistor 108. Thus, in this situation the gain may be set at a different level so that all of the local stations may be spoken to in a level other than the normal single station conversational level. Regardless of which gain level is selected, though, the output from the dual level control and selector means 68 is connected to the input of the second talk amplifier means 70.

The second talk amplifier means 70 amplifies the received signal through a low power amplifier 118 such as an LM380 audio power amplifier. To this amplifier are connected various circuit components, as shown in FIG. 4A and as is known in the art, so that approximately two watts of power are provided by the amplifier 118. The output from the amplifier 118 is coupled through a capacitor 120 to the voice-operated relay means 72 which is shown in FIG. 4B.

The voice-operated relay means 72 is a means for switchably connecting the transducer means located at the addressed local stations to a respective one of the output from the talk channel and the input of the listen channel. In general, this can be a switch means having a first pair of first terminals connected to each of the transducer means, a second terminal connected to the output of the talk channel, a third terminal connected to the input of the listen channel, and a pair of switch elements associated with the first pair of terminals for selectively switching the pair of first terminals into electrical connection with a respective one of the second terminal and the third terminal. Such a switch means may also include a second pair of first terminals connected to the transducer means for connecting the transducer means to the output of the power amplifier which may be used with the present invention as discussed above with respect to the first talk amplifier 66. The connections between the first and second pairs of first terminals and the transducer means are illustrated in FIG. 2 by the pairs of lines 44 and 46.

Figure 4B:
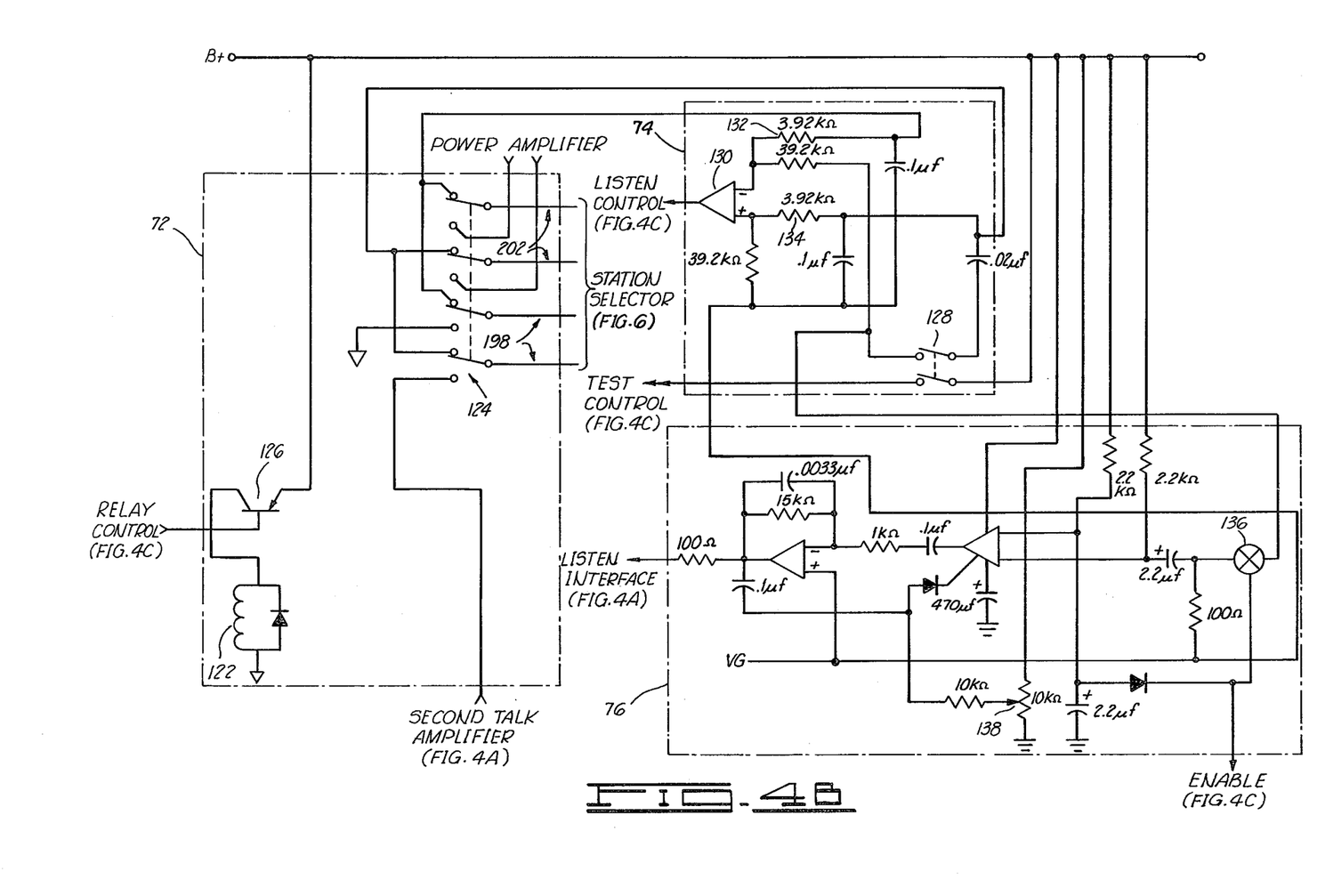
FIG. 4B is a schematic diagram of a preferred embodiment electrical circuit implementing the automatic gain control means, the balance test switch means and the voice-operated relay means shown in FIG. 3.

This general configuration is more particularly defined by a specific embodiment relay shown in FIG. 4B. The relay includes an activating coil 122 which is associated with the switch elements 124. When no current is passing through the coil 122, the switch elements 124 are in their positions as shown in FIG. 4B to thereby provide a connection between the input of the listen channel and the transducer means selected by the station selecting means 38. On the other hand, when current is passing through the coil 122, switch elements 124 switch from their upper positions shown in FIG. 4B to their lower positions against the respective lower contacts of the contact pairs shown in FIG. 4B. In this activated state the relay switch elements 124 connect the selected transducer means to either the normally amplified audio signal from the second talk amplifier means 70 or to the higher power amplifier signal as previously mentioned. Controlling the flow of current through the coil 122, and thus controlling the switching of the switch elements 124, is a transistor 126 used as a switch under the control of the voice-operated relay control means 78.

As previously mentioned, when the relay is in its unactivated state, the switch elements 124 connect the transducer means of the called local stations to the listen channel to thereby permit the calling station to listen to any sounds emanating from the called local station or stations. When such sounds are present and detected, they are transmitted through the unactivated relay to the balance test switch means 74 and to the automatic gain control means 76.

FIG. 4B shows that the balance test switch means 74 includes a switch means 128 which may be manually operated. When the switch 128 is in its open position as shown in FIG. 4B, the detected sound signal is applied to the inputs of an operational amplifier 130 through respective ones of a resistor 132 and a resistor 134. When the switch 128 is closed, the circuit components of the balanced test switch means 74 are interconnected to generate an oscillating signal as is known by those having ordinary skill in the art. Thus, by closing the switch 128, a test signal can be generated and applied to the remainder of the circuit as subsequently described to check and set the balance of the balance and interface means 64.

In additon to being connected to the balance test switch means 74, the detected sound signal is connected to the automatic gain control means 76. FIG. 4B shows that the connection is made through an electronic switch means 136. When the present invention is in the listen mode of operation, the electronic switch 136 is closed to permit the passage of the detected sound signal to the gain control elements. These gain control elements include the various resistors, capacitors, diodes and operational amplifiers shown in FIG. 4B and which are connected as shown therein and as is known by those skilled in the art. In particular, there is a variable resistor 138 which can be adjusted to set the initial level of gain. The output from the automatic gain control means 76 is connected to the balance and interface means 64 as shown in FIG. 4A. When the present invention is in the overriding talk or muted modes of operation as subsequently described, the switch means 136 is opened to prevent the transmission of the detected sound signal to the gain control elements and on to the calling station.

Figure 4C:
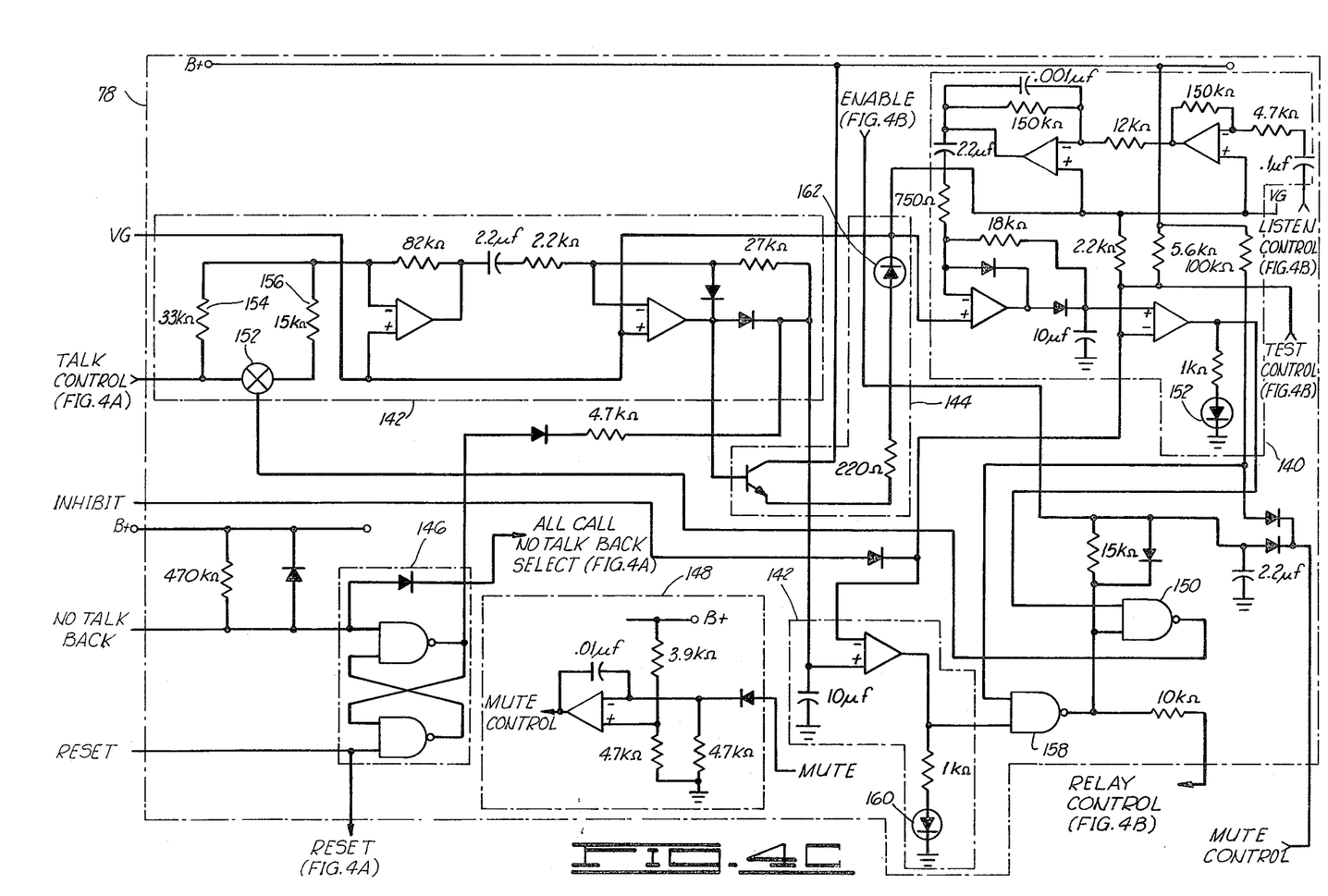
FIG. 4C is a schematic diagram of a preferred embodiment electrical circuit implementing the voice-operated relay control means shown in FIG. 3.

Referring now to FIG. 4C, there is shown a schematic illustration of the preferred embodiment of the voice-operated relay control means 78. This portion of the present invention includes a means 140 for detecting the presence of an audio signal in the listen channel circuit. It also includes a means 142 for detecting the presence of an audio signal and for amplifying such audio signal which is present in the talk channel circuit. Further included in the relay control 78 is a means 144 for indicating the relative magnitude of the signal detected to be present in the talk channel. Also included in the relay control means 78 is a means 146 for providing an inhibit signal to inhibit the talk back operation of the present invention. The relay control means 78 further includes a means 148 for muting the control circuit when two or more telephone handsets within the system have been lifted from their cradles.

The means 140 for detecting the presence of an audio signal in the listen channel is shown in FIG. 4C to include a plurality of operational amplifiers interconnected with a plurality of resistors and capacitors as is known in the art to provide an output signal indicating the presence of a listen channel signal to a NAND gate 150. This output signal also illuminates a light emitting diode 152 to visually indicate the presence of a listen channel signal.

When the means 140 detects the presence of a signal, this causes the gate 150 to provide a switch control signal to the detecting and amplifying means 142.

FIG. 4C discloses that the detecting and amplifying means 142 includes a switch means 152 interconnected with a resistor 154 and a resistor 156. It is the switch 152 which is controlled by the switch control signal provided by the gate 150. FIG. 4C further shows that the means 142 includes a plurality of operational amplifiers interconnected with a plurality of resistor and capacitor elements as is known in the art to provide a talk channel signal detection signal to a NAND gate 158. This detection signal is also applied to a light emitting diode 160 which is illuminated whenever a talk channel signal has been detected. The gate 158 provides a relay control signal which is connected to the transistor 126 shown in FIG. 4B. Thus, when a signal has been detected in the talk channel and is so indicated by the output of the gate 158, the transistor 126 switches "on" to energize the relay coil 122 to thereby switch the elements 124 to connect the talk channel to the called local station transducer means.

The switch means 152 and the resistors 154 and 156 operate under the control of the listen channel signal detection signal means 140 to provide a means for amplifying a talk channel audio signal by a respective one of two predetermined channel control gain levels. The predetermined gain levels are established by the values of the resistors 154 and 156. That is, when no signal is detected in the listen channel, the switch 152 is closed due to the high logic output from the gate 150 to create a parallel connection between the resistors 154 and 156. This establishes a maximum gain condition for the first operational amplifier in the means 142 circuit. This maximum gain condition permits a normal conversational voice level at the calling station to be detected and thus to switch the transistor 126 "on" to thereby connect the talk channel to the transducer means at the called station.

On the other hand, when a listen channel signal is detected, the means 140 drives the gate 150 to a low logic output to open the switch 152 thereby causing only the resistor 154 to be in the gain determination circuit of the first operational amplifier. This switching of effective resistance values provides a lower amount of gain within the means 142 circuit. Thus these elements create a means for automatically preselecting one of the plurality of predetermined gain levels in response to the detecting means 140. As a result of this automatic selection, when a signal has been detected in the listen channel, the signal in the talk channel must have a greater magnitude to cause the talk channel signal detection signal to be generated to activate the voice-operated relay as just described. In other words, when the person at the calling station wishes to speak to one at the called station and there is concurrently a sound at the called station which is detected by the transducer means located there, the person at the calling station must speak louder than normally to overcome the lower gain resulting from the action of the switch 152 in response to the detected listen channel sound. If the caller does speak loudly enough the talk channel overrides the listen channel. This operation of the relay control means 78 prevents lock-up in either the listen or talk modes. Thus, the relay control means 78 provides a means for actuating the voice-operated relay means 72 during a period when a listen channel signal is present. This actuating occurs in response to the detection of a talk channel audio signal which exceeds a predetermined magnitude as determined by the resistor 154 in conjunction with the first operational amplifier in the detection and amplifying means 142.

The means 140 and 142 provide the basic functions of the voice-operated relay control means 78; however, these two means also work in conjunction with the indicating means 144 during the period when the switch 128 of the balance test switch means 74 is closed or, in other words, when a test signal has been applied to the circuit to test and adjust the balance of the balance and interface means 64. When the test condition is present, a light-emitting diode 162 is illuminated to an intensity which is dependent upon the magnitude of the test signal which has been coupled from the listen channel into the talk channel. Thus, by adjusting the variable resistor 86 in the line balance and interface means 64 to obtain a minimum brilliance emitted by the diode 162, the optimum balance point providing minimum feedback can be obtained.

FIG. 4C further indicates that the control means 78 includes a latch means 146 which provides a control signal to indicate when a "no talk back condition" is desired. When this condition is desired, the latch inhibits the operation of the amplifying and detecting means 142 thereby prohibiting the switch of the voice-operated relay means 72 to the talk channel. In this mode the local station transducer means are always connected to the listen channel.

FIG. 4C still further discloses a muting means 148 which includes an operational amplifier interconnected with a plurality of resistors and a capacitor as is known in the art. This means 148 detects when two or more handsets are actively on the tip and ring circuit and provides a mute control signal to inhibit the entire voice-operated relay control means 78 during such condition. This permits handset-to-handset communication and inhibits handset-to-transducer means communication.

In addition to providing the basic function of controlling the talk and listen channel interaction, the channel controlling means 34 provides an access station notifier means 80 having a preferred embodiment circuit diagram as shown in FIG. 4D. This notifier means 80 provides a means for periodically providing a notification signal to the transducer means of those local stations which have been addressed and are in communication with the tip and ring circuit through the talk and listen channels of the channel controlling means 34.

FIG. 4D shows that the notifier means 80 is optoelectrically connected to the station selecting means 38 and a lamp battery by means of an opto-electrical connector means 164. When this opto-electrical means 164 is activated, it drives a first timer means 166, which is connected in a fashion known in the art to a plurality of resistors and capacitors, to provide a time output. In the preferred embodiment of the present invention, for example, this timed output is generated approximately once every fifteen seconds. This generated signal is passed through a plurality of gate means 168 to activate a tone generator 170 associated with the indicated resistors and capacitors to define the frequency of the tone signal. The station alerting tone signal generated by the tone generator 170 is connected to the line balance and interface means 64 as indicated in FIG. 4A.

In addition to the 15-second timer 166, the present invention includes a second timer means 172 which is activated when an "all call-no talk back" situation (i.e., either all stations are being called or the talk channel has been inhibited) is encountered. When such a condition is encountered, the timer 172 also generates a timing signal which activates the tone generator 170 in complement of the first timer 166 to thereby cause a double warning signal to be sent to the addressed transducer means. Thus, by having both a single warning signal (timer 166 operating alone) and a double warning signal (timer 172 complementing timer 166), the present invention permits a person at the called local station to known whether the transducer means located there is actively connected to a calling station in a normal call situation or an "all call-no talk back" situation, respectively.

Figure 5:
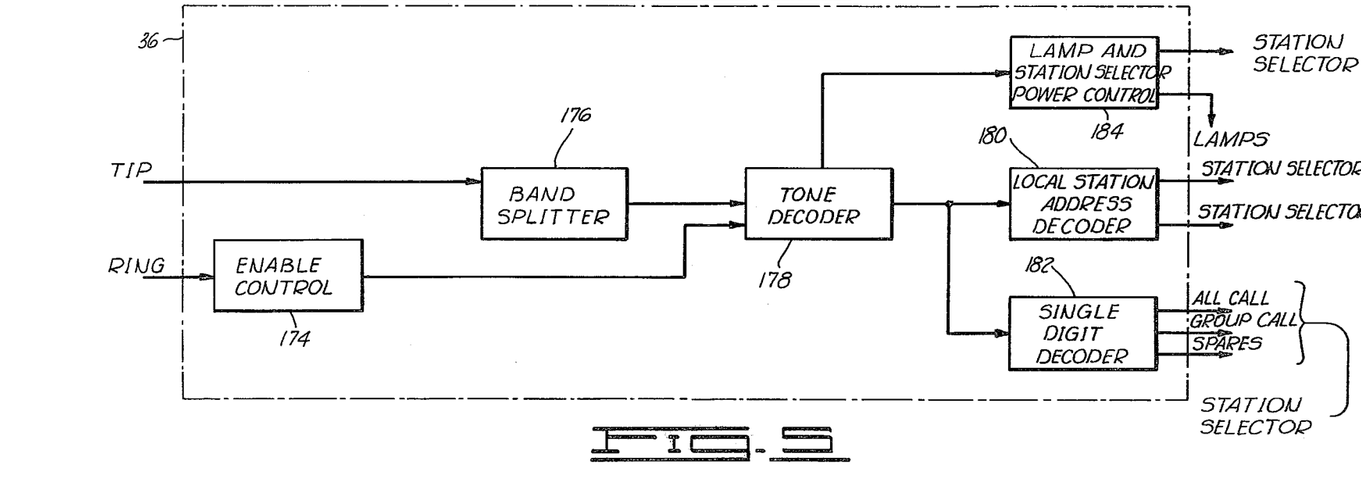
FIG. 5 is a functional block diagram of the call monitoring means shown in FIG. 2.

With reference now to FIG. 5, the functional block diagram of the elements of the call monitoring means 36 will be described. This call monitoring means 36 is a means which is connected to the tip and ring circuit for detecting when a call has been placed by one of the telephones in one of the local stations addressing one of the transducer means of the local stations. In the basic system of a single telephone and a single transducer means, the monitoring means is connected to the telephone of the first local station for monitoring when the telephone initiates a call to the transducer means of the second local station.

FIG. 5 discloses that the call monitoring means 36 includes an enable control means 174 connected to the ring line for enabling the monitoring means 36 in response to a signal from the calling telephone on the ring line. Connected to the tip line and to the output of the enable control is a band splitter means 176 which is a means for splitting the frequency bands contained within an address signal sent along the tip and ring circuit from the calling telephone by means of its dialing mechanism. The output from the band splitter is connected to a tone decoder 178 which is a means for decoding the tones contained within each of the split frequency bands. The output of the tone decoder 178 is connected to a local station address decoder means 180 and to a single digit decoder means 182 which provide means for activating the individually or collectively addressed transducer means located in the appropriately addressed local stations. The tone decoder 178 also provides an output to activate a lamp and station selector power control means 184 which, when activated, supplies power to the station selecting means 38 and to lamps located at each of the telephones within the system.

Applicant believes that circuit embodiments of each of the individual elements within the call monitoring means 36 are individually known by those skilled in the art, and thus no detailed circuit analysis of the elements will be made.

Figure 6:
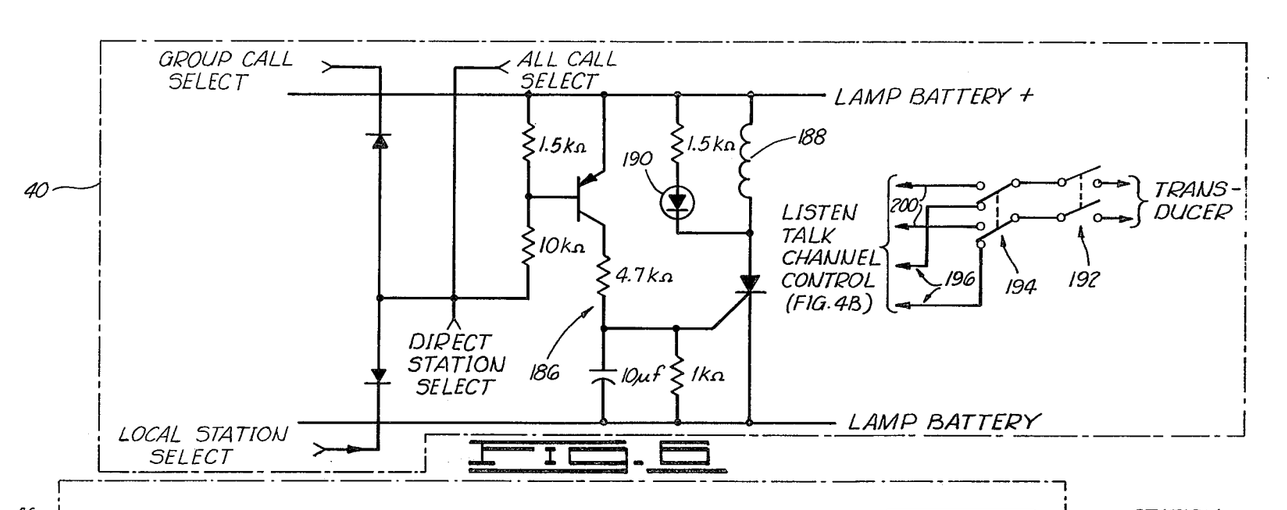
FIG. 6 is a schematic diagram of a preferred embodiment electrical circuit implementing one of the local station selectors shown in FIG. 2.

With reference now to FIG. 6, the preferred embodiment circuit diagram of the local station selector 40 within the station selecting means 38 will be described. It is to be noted that each of the local station selectors includes a similar type of circuitry. FIG. 6 shows that the local station selector 40 includes a plurality of inputs to which are connected the address select lines. These lines include "group call select", "all call select", "local station select" and "direct station select". The "group call select" and "all call select" lines address the station in response to signals from the single digit decoder means 182 shown in FIG. 5. FIG. 2 indicates these address lines as the "all call" line 50 and the "group call" line 52. The "local station select" line addresses the station in response to a signal from a respective one of the lines extending from the local station address decoder means 180 shown in FIG. 5. With respect to the local station selector 40, FIG. 2 indicates this to be the first address line 56. The "direct station select" line addresses the station in response to a direct call from the direct station selector 22 shown in FIG. 2. With respect to the local station selector 40, FIG. 2 indicates this call would be via line 60.

These inputs from these lines are connected to a switching circuit which includes a resistor-capacitor network, a transistor, and a silicon controlled rectifier generally indicated by the reference numeral 186. This switching network controls the energization of a relay coil 188 and its accompanying light-emitting diode 190 which is illuminated when the coil is activated. The relay which includes the coil 188 also includes a pair of switch elements 192 which are connected to a transducer means at a respective one of the local stations and which are normally open (as shown in FIG. 6) when the coil 188 is unactivated. In this open position the transducer means to which the relay is connected is not in communication with the talk and listen channels of the channel controlling means 34. When the switching network 186 is activated in response to being addressed over one of the address lines to energize the relay coil 188, the switch elements 192 are closed to connect the transducer means to the channel controlling means 34. If the controlling means 34 is in the listen mode (i.e., the calling station is not causing the talk channel to override the listen channel), the transducer means is in communication with the listen channel by means of the switch elements 192 being closed and a manual switch means 194, and the switch elements 124 of the relay 72 being in the position shown in FIG. 4B. If the controlling means 34 is in the talk mode, the transducer means is connected either to the conversational level power amplifier 118 shown in FIG. 4A or to the high power amplifier previously mentioned as being capable of incorporation with the present invention. The particular connection depends upon the setting of the manual switch means 194. With the switch means 194 set as shown in FIG. 6 and the switch elements 192 closed, the transducer means would be connected to the amplifier 118 via conductors 196 in FIG. 6 and conductors 198 in FIG. 4B. With the switch means 194 switched to its alternate position, the transducer means would be connected to the optional power amplifier via conductors 200 in FIG. 6 and conductors 202 in FIG. 4B.

Thus FIG. 6 shows that the station selecting means 38 includes a plurality of means for selectively connecting the appropriately addressed local station or stations to the talk and listen channels in response to address signals from the call monitoring means 36 via the several input lines to each local station selector. More particularly, each local station selector includes a first switch means which is responsive to such an address signal from the call monitoring means and also includes a second switch means which is manually switchable between either the conversational level power amplifier disclosed in FIG. 4A or with the power amplifier indicated in FIG. 4B.

With general reference to all of the drawings, the operation of the preferred embodiment of the present invention will now be described with reference to a system having a plurality of telephones and transducer means. When one wants to use the system to address one or more of the transducer means contained within the system, that person lifts the handset off any one of the telephones which is within the system. This generates on the tip and ring circuit a signal which is detected by the call monitoring means 36. This illuminates the lamps disclosed in FIG. 5 to indicate to all telephones within the system that the system is in use.

Next, the user punches in either a one- or two-digit address to indicate the one or more local stations to be called. If a single digit is punched, the single digit decoder means 182 determines whether either a "group call" or an "all call" is being made to a collection of some or all of the local stations. If a two-digit address is punched, then the local station address decoder means 180 determines the individual station called and causes the particular relay coil 188 and switch element 192 of the called station to close thereby connecting the transducer of the addressed local station with the talk and listen channels of the system. It is to be noted when a local station is connected in active communication with the system, it is maintained in such active communication until the calling station hangs up the handset. Thus, a plurality of individual stations can be called in any sequence thereby providing a conference call capability to the system.

Once a local station has been addressed and connected to the listen/talk channel controlling means 34, and sound which is detected by the transducer means located at the addressed local station is transmitted to the calling telephone. This is accomplished by means of the switch elements 124 shown in FIG. 4B being initially in their listen mode. When the system detects the presence of a signal in its listen channel, the voice-operated relay control means 78 operates to reduce the gain in the amplifying and detecting means 142.

In particular, in the preferred embodiment shown in FIG. 4C, when a sound is detected in the listen channel, the switch means 152 is opened to disconnect the parallel combination of the resistors 154 and 156. In the particular FIG. 4C embodiment this reduces the gain by a factor of approximately 0.67. Thus, as previously described, for a caller at the calling station to talk to a person at the transducer means, the caller must speak louder than when the gain is higher to overcome the reduced gain of the voice-operated relay control means 78. However, when the caller does speak loudly enough, the amplifying and detecting means 142 provides a signal to the gate 158 which causes the transistor 126 shown in FIG. 4B to conduit to thereby activate the coil 122. The activation of the coil 122 causes the switch elements 124 to switch and connect the transducer means to the talk channel of the channel controlling means 34. The caller may then broadcast through the addressed transducer means. It is to be noted that when there is no sound signal detected by the listen channel, there is no reduced gain in the voice-operated relay control means 78 so that a normal voice level will cause the talk channel to override the listen channel to permit the caller to broadcast over the accessed transducer means.

When the transducer means is connected to the talk channel, it is shown in FIG. 4D that either the normal conversational power amplifier 118 shown in FIG. 4A is connected to the transducer means or a higher power amplifier, which may be connected between the first talk amplifier 66 shown in FIG. 4A and the relay switch means 124 shown in FIG. 4B, is connected to the transducer means. The particular one of the two possible audio signals which can be output from these amplifiers through the transducer means is selected by manually switching the switch means 194 shown in FIG. 6 as previously discussed.

In addition to providing this two-way communication in either a conversational level or a higher power amplified level, the present invention can inhibit the talk back capability. This may be done by activating the latch 146 shown in FIG. 4C. This inhibiting capability is also accomplished by means of the mute control 148 when two or more handsets are removed from their cradles as previously discussed.

Still another feature of the present invention is the providing of a warning signal to all accessed transducer means. This is shown in FIG. 4D to occur when a coil 188 in a local station selector as shown in FIG. 6 has been activated. This occurrence causes the activation of the opto-electrical means 164. This in turn causes the generation of a periodically generated tone which is applied to the talk channel of the listen/talk channel control means 34 for the transmission to any transducer means which is actively connected to the channel controlling means 34. Also as previously mentioned, a second tone is generated to signify an "all call" or "no talk back" condition in the system.

One further feature to be noted is that during the operation of the talk mode, the communication over the conversational power amplifier lines can be further modified by either one of the two separate level controls as indiciated in FIG. 4A. In particular, when less than all of the stations are being called and when there is not a "no talk back" condition, then one level is selected by means of the dual level control and selector means 68. When an "all call" condition or a "no talk back" condition does exist, however, then a second level is selected. This feature is desirable to permit individual control of both the private conversational level and the public "all call" level.

Thus, the present invention of a hands-free talk-back intercom system is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. A communication system having a talk channel and a listen channel, said system comprising:
   a main distribution station;
   a plurality of local stations associated with said main distribution station which includes a first local station having a first telephone, and a second local station having a first transducer means in balanced electrical connection with said main distribution station;
   means at said main distribution station connected to said first telephone for monitoring when said first telephone initiates a call to said second local station;
   means for enabling said monitoring means responsive to a signal from said first telephone;
   means for splitting the frequency bands of an address signal from said first telephone;
   means for decoding the tones from said split frequency bands;
   means for selecting said first transducer means responsive to said monitoring means detecting initiation of a call to said second local station;
   means for activating said transducer selecting means responsive to said tone decoding means;
   means for supplying electrical power to said transducer selecting means responsive to said tone decoding means; and
   means for controlling said communication of said talk and listen channels between said first telephone and said first transducing means.

2. A communication system as recited in claim 1 wherein:
   said first local station further includes a second transducer means in balanced electrical connection with said main distribution station; and
   said second local station further includes a second telephone.

3. A communication system as recited in claim 2 wherein each of said balanced electrical connections of said first and second transducer means includes a single twisted pair of electrically conducting wires.

4. A communication system as recited in claim 1 wherein said talk and listen channel controlling means includes:
   means for providing an electrical interface between said talk channel and said listen channel and said first telephone;
   means associated with said interfacing means for balancing said interface;
   first talk amplifier means connected to said interface means;
   first means for setting a first level of loudness and second means for setting a second level of loudness wherein each of said first and second means is responsive to a first signal from said call monitoring means for selectable connection to said first talk amplifier means;
   second talk amplifier means connected to said first and second level setting means for providing an output from said talk channel;
   means connected to said second talk amplifier for switchably connecting said first transducer means to a respective one of said output from said talk channel and an input to said listen channel;
   means connected to said switchable connecting means for providing said input to said listen channel and for activating an electrical signal for testing said balancing means;
   means connected to said test activating means and to said interface means for automatically controlling the gain of said listen channel; and
   means connected to said interface means, said test activating means and said switchable connecting means for automatically controlling the switching by said switchable connecting means of said first transducer means to a respective one of said output of said talk channel and said input of said listen channel.

5. A communication system as recited in claim 1 wherein said transducer selecting means includes:
   first switch means responsive to a signal from said call monitoring means; and
   second switch means manually switchable.

6. A hands-free talk-back intercom system comprising:
   a plurality of local stations, at least one of which includes a telephone having a tip and ring circuit and at least a different one of which includes a means for transducing sound pressure waves into electrical signals;
   a main distribution station having a first pair of terminals connected to said tip and ring circuit and having a plurality of second pairs of terminals connected to respective pairs of balanced lines which extend to said main distribution station from respective ones of said local stations and to which respective ones of said transducing means are connected at said respective ones of said local stations, said main distribution station further having a listen channel and a talk channel;
   means at said main distribution station for generating an oscillating electrical signal in said listen channel;
   means for coupling said oscillating electrical signal to said talk channel and to said tip and ring circuit;
   means for indicating the relative magnitude of said oscillating electrical signal detected in said talk channel; and
   means for variably adjusting the balance of said coupling means so that said indicating means indicates that a minimum magnitude of said oscillating electrical signal is coupled into said talk channel.

7. An intercom system as recited in claim 6 wherein:

said main distribution station further includes a plurality of single terminals, each single terminal corresponding to a respective one of said local stations; and said intercom system further comprises a direct-select station having a plurality of outputs connected to respective ones of said plurality of single terminals.

8. An intercom system as recited in claim 6 wherein said main distribution station includes:
- means for selectively switching said tip and ring circuit into communication with one of said transducing means;
- means for adjustably setting two separate levels of gain in said talk channel; and
- means for automatically selecting one of said two gain levels responsive to said selective switching means.

9. An intercom system as recited in claim 8 wherein said main distribution station includes:
- means connected to said tip and ring circuit for detecting a call being placed on one of said telephones and addressing one of said local stations;
- means connected to said tip and ring circuit for controlling the communications over said talk channel and listen channel between said calling telephone and said addressed local station; and
- means for selectively connecting said addressed local station to said talk and listen channels responsive to command signals from said call detecting means.

10. An intercom system as recited in claim 6 wherein said main distribution station includes means for periodically providing a notification signal to respective ones of said transducing means which are in communication with said tip and ring circuit.

11. An intercom system as recited in claim 6 wherein said talk and listen channel communications controlling means includes:
- first means for providing an interface between said talk and listen channels and said tip and ring circuit, said interface means including means for electrically balancing said interface;
- a talk channel circuit connected to said first interface means, said talk channel circuit including:
  - first amplifier means connected to said first interface means;
  - means connected to said first amplifier means for variably setting two separate levels of gain and for automatically selecting one of said two levels in response to command signals from said call detecting means; and
  - second talk amplifier means connected to said setting means;
- a listen channel circuit connected to said first interface means, said listen channel circuit including:
  - means for testing the balance of said balancing means; and
  - means for automatically controlling the gain of said listen channel; and
- second means for providing an interface between said local station selective connecting means and said talk and listen channels responsive to signals from said talk and listen channels.

12. An intercom system as recited in claim 11 wherein said second interface means includes:
- a voice-operated relay connected to said local station selective connecting means, said talk channel circuit and said listen channel circuit; and
- means connected to said talk channel circuit, said listen channel circuit and said relay for controlling the switching by said voice-operated relay of said local station selective connecting means to a respective one of said talk channel circuit and said listen channel circuit.

13. A two-way communication system having a talk channel circuit having a first input and a first output and a listen channel circuit having a second input and a second output, comprising:
- a telephone having a tip and ring circuit interfaced with said first talk input and said second listen output;
- a transducer having a balanced pair of wires;
- a first switch means connected to said balanced pair of wires;
- a second switch means having a first pair of terminals connected to said first switch means, a second terminal connected to said first output of said talk channel circuit, a third terminal connected to said second input of said listen channel circuit, and a pair of switch elements associated with said first pair of terminals for selectively switching said first pair of terminals into electrical connection with a respective one of said second terminal and said third terminal;
- means for detecting the presence of an audio signal in said listen channel circuit;
- means for amplifying by a respective one of a plurality of predetermined gain levels an audio signal in said talk channel circuit;
- means for preselecting said respective one of said plurality of predetermined gain levels responsive to said detecting means; and
- means for actuating said second switch means responsive to said amplified talk channel audio signal exceeding a predetermined level.

* * * * *